United States Patent
Davis et al.

(10) Patent No.: US 7,383,391 B2
(45) Date of Patent: Jun. 3, 2008

(54) PREFETCH MECHANISM BASED ON PAGE TABLE ATTRIBUTES

(75) Inventors: Gordon Taylor Davis, Chapel Hill, NC (US); Thomas B. Genduso, Apex, NC (US); Harold F. Kossman, Rochester, MN (US); Robert W. Todd, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 365 days.

(21) Appl. No.: 11/131,582

(22) Filed: May 18, 2005

(65) Prior Publication Data

US 2006/0265552 A1    Nov. 23, 2006

(51) Int. Cl.
*G06F 9/34* (2006.01)
*G06F 12/10* (2006.01)

(52) U.S. Cl. ....................... 711/137; 711/206
(58) Field of Classification Search ................ 711/137, 711/206
See application file for complete search history.

(56) References Cited

U.S. PATENT DOCUMENTS

| | | | |
|---|---|---|---|
| 5,809,560 A | 9/1998 | Schneider | |
| 5,958,040 A | 9/1999 | Jouppi | |
| 6,490,658 B1 | 12/2002 | Ahmed et al. | |
| 6,542,968 B1 | 4/2003 | Spencer et al. | |
| 6,557,081 B2 * | 4/2003 | Hill et al. | 711/137 |
| 6,993,630 B1 * | 1/2006 | Williams et al. | 711/137 |
| 2001/0042185 A1 * | 11/2001 | Franaszek et al. | 711/206 |
| 2003/0115422 A1 | 6/2003 | Spencer et al. | |

OTHER PUBLICATIONS

IBM Technical Disclosure Bulletin, vol. 33, No. 3B (Aug. 1990) Preemptible Cache Line Prefetch Algorithm and Implementation, pp. 371-373.

* cited by examiner

*Primary Examiner*—Hyung Sough
*Assistant Examiner*—Duc T Doan
(74) *Attorney, Agent, or Firm*—Sawyer Law Group LLP

(57) ABSTRACT

A prefetch mechanism using prefetch attributes is disclosed. In one aspect, an explicit request for data stored in a memory is provided, and a prefetch attribute in a page table entry associated with the explicit request is examined to determine whether to provide one or more prefetch requests based on the prefetch attribute. Another aspect includes determining dynamic prefetch attributes for use in prefetching data, in which prefetch attributes are adjusted based on memory access requests that target next sequential blocks of memory relative to the most recent previous access in a page of memory.

2 Claims, 5 Drawing Sheets

PREFETCH MECHANISM BASED ON PAGE TABLE ATTRIBUTES

FIELD OF THE INVENTION

The present invention relates to caching data for processors, and more particularly to prefetching of data to a cache for more efficient processor operation.

BACKGROUND OF THE INVENTION

Typical processor system designs use various cache techniques to minimize the effects of memory access latency on processor performance. A cache is a smaller block of memory than main memory that can be accessed faster than memory levels organized beneath it. When a block of memory is accessed from lower levels such the main memory, it can be copied into the cache. Future accesses to that memory can retrieve the data more quickly from the cache than from main memory, creating much less likelihood that the processor will stall when waiting for data to be fetched from memory.

Prefetching of data or instructions prior to explicit requests for that data from the processor is a technique that is sometimes used in conjunction with a cache, in an attempt to improve cache effectiveness. Prefetching obtains data from memory and makes it available to the processor in the cache before potential accesses to the data occur from the processor executing instructions, thus reducing memory latency. Cache lines (contiguous blocks of data in a cache, each fetched as a unit) can be brought into the cache preemptively, before a demand miss occurs to those lines in which the data requested by the processor is not in the cache.

Requests for prefetching data are typically based on previous explicit requests. For example, if an explicit request from the processor is for a particular block in memory, then a prefetch request following that explicit request can issue a read command to memory for the next sequential block of data after the explicitly-requested block. The prefetch request is typically for a block the size of a cache line.

Prefetching can be very effective for some scenarios, such as sequential code execution, sequential data access, or stack operations. However, prefetching may actually be detrimental to performance for other scenarios, such as a function call to a short procedure, non-sequential or random data access, linked list processing, or a regular stride (distance in bytes between accesses) greater than one cache line through a large data structure. Thus, it is useful to be able to distinguish the scenarios in which prefetching is efficient, and scenarios in which prefetching is detrimental.

Prior solutions to determine the value of prefetching for particular data involves a hardware prefetch mechanism that examines a number of accesses by the processor to memory and examines access patterns. From these patterns, the prefetch mechanism could determine which data was sequentially accessed and/or likely to be accessed in the future, and prefetch that data in the detected sequence. However, a problem with this method is that the prefetch mechanism must not prefetch any data for several initial accesses, before any pattern is detected. Thus, there are several missed opportunities for prefetching data that are missed, causing less optimal performance. In addition, prior mechanisms may have difficulty in detecting a stride in the processor accesses other than one cache line. Strides of greater than one cache line might be used, but the prefetch mechanism might have to examine several accesses before an unusual stride is detected, at which point it can prefetch data at the correct stride addresses.

Cache touch instructions can potentially be useful for some of the scenarios that are not handled well with prefetching. Cache touch instructions, when executed by the processor, can prefetch data that will be needed after a few iterations, e.g., the touch prefetches data from the next cache block. However, compilers are seldom effective at using cache touch instructions.

Accordingly, what is needed is an apparatus and method for providing prefetching of data and instructions that is more reliable and efficient than the prior prefetching techniques. The present invention addresses such a need.

SUMMARY OF THE INVENTION

The invention of the present application relates to caching data for processors, and more particularly to prefetching of data to a cache for more efficient processor operation. In one aspect of the invention, a method for prefetching data for use by a processor includes providing an explicit request for data stored in a memory, and examining a prefetch attribute in a page table entry associated with the explicit request, the page table entry used for translating an address used by the explicit request to a physical address of the memory. It is determined whether to provide one or more prefetch requests based on the prefetch attribute, where the prefetch requests operate to retrieve and store data from the memory that potentially will be requested by the processor.

In another aspect of the invention, a system for prefetching data includes a processor operative to provide explicit requests for data stored in a memory, the processor including a prefetch mechanism operative to provide prefetch requests that retrieve and store data from the memory that potentially will be requested by the processor. Also included are page table entries stored in a cache and used to translate addresses used by the explicit requests to physical addresses of the memory. Each page table entry includes a prefetch attribute that indicates to the prefetch mechanism whether to provide one or more prefetch requests after an associated explicit request is issued.

In another aspect of the invention, a method for determining a dynamic prefetch attribute for use in prefetching data for a processor includes incrementing a counter value if a memory access request to a page of memory targets a next sequential block of memory relative to the most recent previous access in the page of memory. The counter value is transferred to a prefetch attribute for the page of memory when a memory access does not target the next sequential block of memory. The prefetch attribute is stored in a page table entry associated with the page of memory, where the prefetch attribute is examined during explicit access requests to the memory to determine the number of prefetch requests to provide.

The present invention provides a method and system that provides a prefetch mechanism using prefetch attributes stored in page table entries. The prefetch attributes indicate whether prefetching is suitable for a particular region of memory, and, if so, the degree of prefetching that is suitable. This allows prefetching of data to begin quickly, without having to analyze processor accesses to memory before determining prefetching suitability and characteristics. Furthermore, aspects of the present invention allow prefetch attributes to be dynamically determined and optimized based on previous accesses of the processor to a region of memory.

DETAILED DESCRIPTION

The present invention relates to caching data for processors, and more particularly to prefetching of data to a cache for more efficient processor operation. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is mainly described in terms of particular systems provided in particular implementations. However, one of ordinary skill in the art will readily recognize that this method and system will operate effectively in other implementations. For example, the system architectures usable with the present invention can take a number of different forms. The present invention will also be described in the context of particular methods having certain steps. However, the method and system operate effectively for other methods having different and/or additional steps not inconsistent with the present invention.

To more particularly describe the features of the present invention, please refer to FIGS. 1 through 5 in conjunction with the discussion below.

Figure 1:
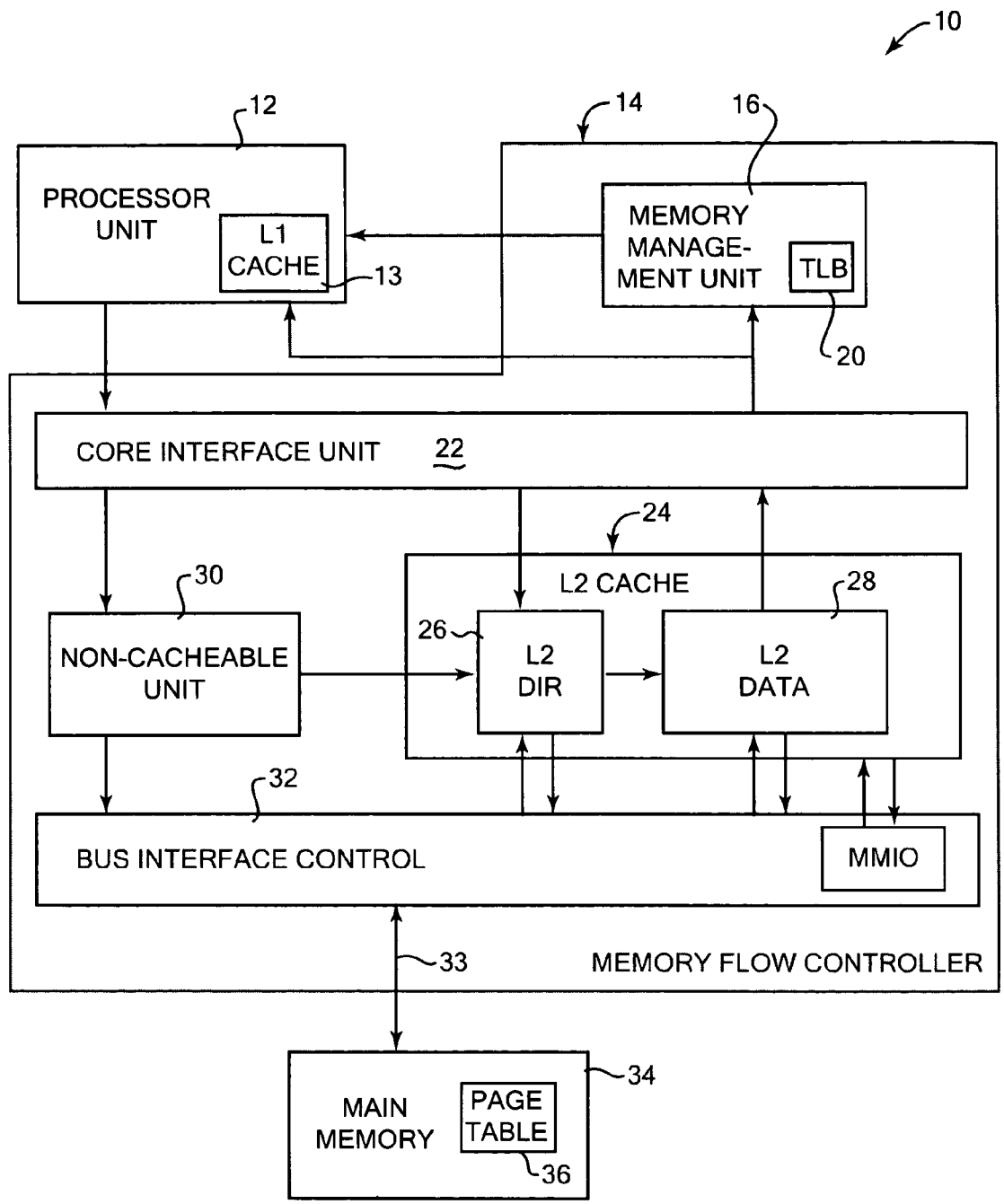
FIG. 1 is a block diagram illustrating a microprocessor system suitable for use with the present invention.

FIG. 1 is a block diagram of an example of a microprocessor system 10 suitable for use with the present invention. System 10 is a typical microprocessor subsystem that can be provided on a microprocessor chip (and/or connected chips, if appropriate). In this example, the system 10 is similar to an implementation of the PowerPC® microprocessor architecture from IBM Corporation. Other embodiments can use processor systems from other microprocessor architectures, such as provided by Intel Corp., Advanced Micro Devices, Inc., or other companies.

System 10 includes a processor unit 12, a memory flow controller (MFC) 14, and a main memory 34. In many processor systems, there is a hierarchy of memory in which the lower levels (e.g. L1) are much faster but more limited in storage capability, while the higher levels (e.g. L2, or possibly L3) are slower to access but higher in storage capability. For example, in many PowerPC processor systems, the hierarchy of memory storage starts with registers in the processor unit, followed by an L1 cache 13 in the processor unit 12, followed by an L2 cache 24 outside the processor unit, followed by any additional caches, followed by main memory 34, followed by virtual memory on a hard disk or other storage device. Herein, the various memory storage used in the system, as well as components needed to operate the memory (e.g. memory controller), is referred to as the "memory subsystem."

The processor unit 12 includes various execution units for executing program instructions. The processor unit 12 includes components, i.e., a prefetch mechanism, that can perform prefetches of instructions or data according to the present invention and store the prefetched data in a cache. Herein, the term "data" is used generically to refer to both instructions and data which can be prefetched and cached.

In addition, the processor unit 12 can include a cache 13, often called an L1 cache that is provided in the processor core. The L1 cache 13 provides the lowest level cache beyond the registers of the processor, and thus allows the speediest access to cached data. For example, in the PowerPC processor architecture, the processor unit 12 includes an instruction unit and an execution unit (among other components). An L1 instruction cache is included in the instruction unit, and an L1 data cache is included in the execution unit. Each cache has an associated Effective-to-Real Address Translation function (ERAT) which provides cached versions of the most recently used (actively accessed) entries from the page table in memory (or from the TLB, described below) to allow translation of effective addresses used in software to physical addresses of the hardware. If the processor unit 12 requests an access to memory for data, the ERAT function provides a translation to allow examining the L1 instruction or data caches for the data. According to the present invention, prefetch attributes can be provided in the page table entries stored in the ERAT to indicate the desirability and number of prefetch requests when the processor's explicit request retrieves the requested data in the L1 data cache. This is described in greater detail below.

The processor unit 12 is coupled to a memory flow controller (MFC) 14, which performs memory cache functions, interface control, and other functions. The MFC 14 includes a memory management unit (MMU) 16 which performs address protection and address translation. For example, the processor unit 12 may request a read or write access in memory. The memory address referenced by the processor unit 12 (e.g., the effective address referenced by an explicit request) is sent to the MMU 16 if translation data is not found in the ERAT contained in the processor unit 12, and is translated into a physical address. Whether the translation data is found in the ERAT or in the TLB within the MMU 16, the translation data is used to generate a physical address that is placed on the address bus to access the data in a higher level of cache or in memory.

To perform the address translation, the MMU 16 typically includes a small amount of memory (a cache) that holds one or more page table entries that map effective addresses to physical addresses. In PowerPC® embodiments, this cache is called the Translation Look-aside Buffer (TLB) 20. The TLB 20 includes page table entries for the most recent processor accesses to memory. This is similar to the ERAT function in the processor unit 12, but the TLB 20 may hold more page table entries than the ERAT.

Requests for data from the processor unit 12 (that cannot be translated by the ERAT) are sent to the MMU 16. The TLB 20 accepts the effective address from the processor and translates it to the physical address to be presented to the rest of the system. When a TLB miss occurs, the translation data must be accessed from the page table 36. A system may include hardware to access a page table entry. Alternatively, an exception is taken and the operating system loads the proper page table entry from memory 34. If the data is not in memory, the MMU issues a page fault interrupt.

An example of memory attributes for a page table entry in the TLB 20 (or in the ERAT or page table in main memory) is described below with respect to FIG. 2.

A core interface unit 22 operates as a switch between the processor unit 12 and an L2 cache 24, allowing the processor unit 12 to access the L2 cache. The core interface unit 22 accepts load and store requests from the processor unit 12 and sequences those requests to an L2 controller (not shown). The L2 directory 26 in the L2 cache 24 is used in conjunction with the L2 data array 28 to locate the desired cache line to read or modify A non-cacheable unit 30 is associated with the processor unit 12 and handles instruction-serializing functions and performs any non-cacheable operations in the storage hierarchy. A bus interface control 32 can interface with the L2 cache 24, a system bus 33 connecting it to main memory 34, and/or other caches or components. The control 32 thus helps provide a path from the processor unit 12 to the main memory 34. The main memory 34 includes the various data needed for operation of the system, include a large page table 36 including entries for all the pages of available memory. Herein, the term "region" or "page" refers to the portion of memory that is referenced by a page table entry; a page can be of various sizes in different embodiments or applications. Furthermore, the term "page table entry" can refer to an entry in the ERAT of processor unit 12, in the TLB 20 of MMU 16, or in the page table 36 of main memory 34. The main memory 34 can include memory devices that are separate from the processor package that includes the processor unit 12 and memory flow controller 14, for example.

Figure 2:
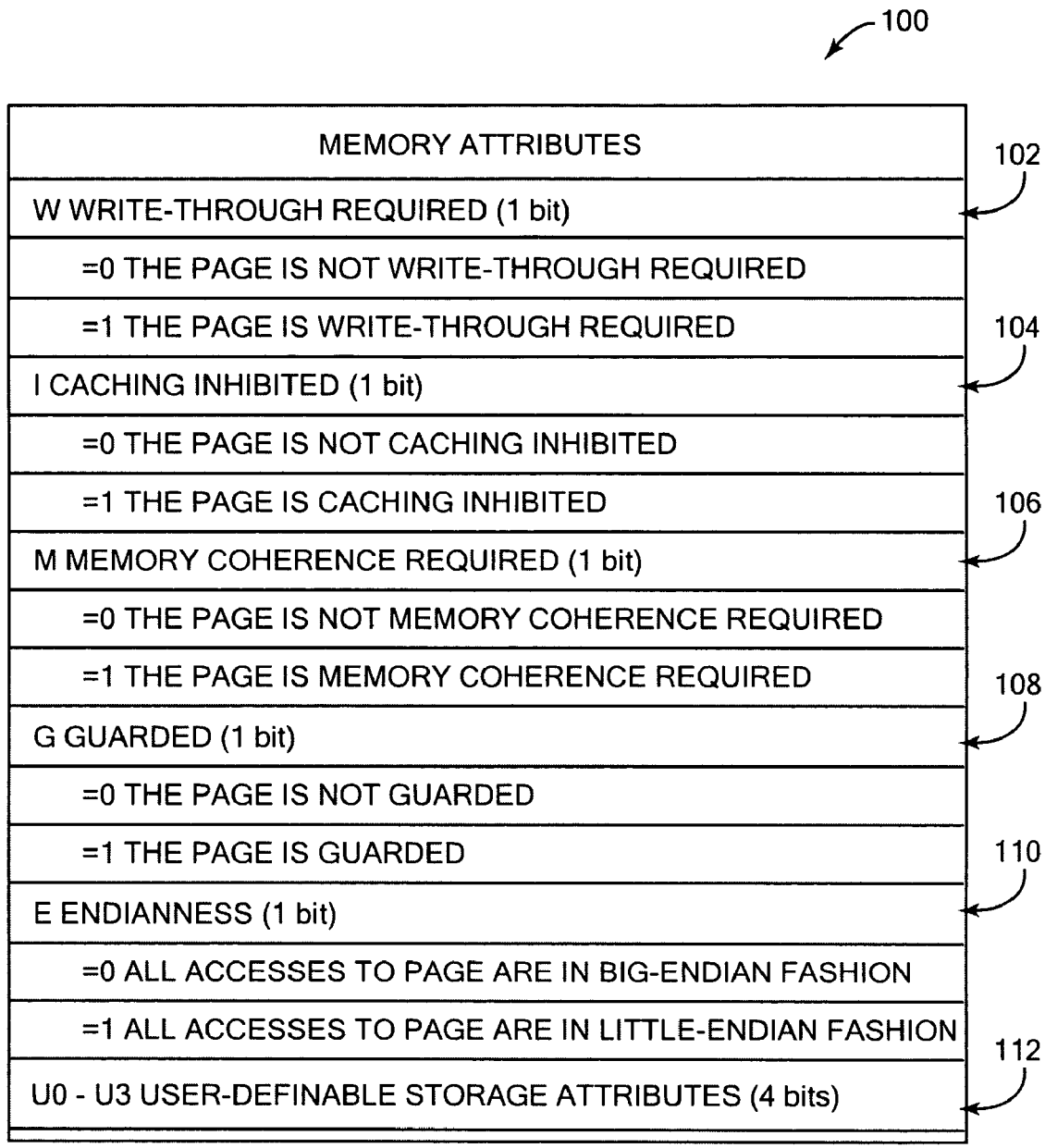
FIG. 2 is a table diagram illustrating memory attributes, including attributes for use with the present invention.

FIG. 2 is a table 100 of example page table entry memory attributes, including attributes for use with the present invention. These attributes can be provided in a page table entry and can be applied to the same region or page in memory to which the page table entry applies. The page table entries are stored in the main page table 36 in main memory 34, and subsets of the page table entries are stored in the TLB 20 and in the ERAT function of the processor unit 12. The attributes of table 100 are used to apply specific memory attributes to a page in memory, where different types of memory typically use different attributes. For example, operating system, application code, stack space, working variables, memory-mapped I/O space, and application data each may require assignment of different memory attributes specific to their requirements. Each memory access to the associated memory page is performed according to the attributes of the page table entry. These attributes have meaning in determining if and how the associated page can be accessed.

The present invention is an extension to existing methods used for the management of memory attributes. In the present invention, each memory page may also be associated with an additional characteristic that indicates the benefit of prefetching for that memory page.

An example of page table entry memory attributes for the Book E PowerPC® processor are shown in the table 100 of FIG. 2. Each page table entry can specify these attributes. The first five bit attributes shown govern various storage attributes, including write-through required 102, caching inhibited 104, memory coherence required 106, guarded 108, and endianness 110. As is well known, the write-through required attribute causes a store to that storage location to also be performed in main memory; the caching inhibited attribute causes an access to that storage location to be performed in main memory, and no copy of the accessed location is placed in the caches; the memory coherence required attribute causes an access to that storage location to be performed coherently; the guarded attribute causes a data access to that storage location to be performed only if the instruction is required by the sequential execution model, or it is a load access for a storage location already in a cache; and the endianness attribute causes accesses to the page to be in little-endian fashion or big-endian fashion, as specified. Other systems may use different memory attributes or types of attributes to control other characteristics, as is well known.

In the embodiment of FIG. 2, there is also a field of four bits allocated to "User Defined" attributes 112, which allow a user to define bits for controlling other desired characteristics in memory. Other processor architectures typically support similar user-defined memory attributes, and usually have reserved fields that can be used. The user-defined attributes provide a mechanism for the present invention to control prefetch characteristics. Other embodiments may include attributes specifically designed for the prefetch functions of the present invention.

In one embodiment of the present invention, two user-defined bits 112 are used to indicate a desire to prefetch 0, 1, 2, or 3 additional cache lines, based on the two-bit binary value, after servicing the explicit memory access request to this page of memory. Other embodiments can allocate more than two bits, or a single bit, to control pre-fetch to similarly indicate more (or less) additional cache lines for prefetch.

Thus, the present invention allows a processor system to quickly and easily examine this attribute in a page table entry to determine whether or not there will be benefits to prefetching for that data, and, if prefetch requests are beneficial, a number of prefetch requests to send to cause more efficient operation of the system. It is a much quicker procedure to examine page table attributes of the present invention to determine whether prefetching is beneficial, compared to the prior hardware prefetching mechanisms, which had to examine patterns in sequential memory access to determine whether to use prefetching, and thus missed several early opportunities for prefetching when still determining the access patterns.

In one embodiment, to determine the desirable prefetch values of the present invention for each page table entry, profiling of executing code, similar to that used with compiler optimizer options based on profiling, can be adapted for prefetching use. Profiling allows statistics of code features to be gathered when the code is executing. For example, the total number of times each code line is executed, the minimum or maximum amount of time spent executing a give line of code, how often a line of code or function is called, etc. From these statistics, it can be determined how efficiently the code is executing, and how to change the code for more efficient operation. When adapting such profiling for the prefetching use of the present invention, similar characteristics can be recorded and analyzed. For example, the number of times a given page table entry and memory page are accessed can be logged to determine how many sequential memory blocks are typically accessed. This would indicate how many cache lines should be prefetched when that memory block is subject to an explicit request. For example, the (static) prefetch attributes can be determined using profiling techniques similar to the techniques described for determining the dynamic attribute values as described below with reference to FIG. 5. In addition, prefetch attribute values can be set to some starting values, and further adjusted to optimize performance, if necessary, in light of the resulting performances with the same source code.

In another embodiment, there is additional capacity in the page table entries to allow a second user-defined field to be used to control a prefetch stride. This would allow each prefetch request address to be incremented in accordance with the number stored in the stride field so that a regular offset in memory can be provided between prefetch requests. This feature would not be useful for page table entries associated with instruction segments, but can provide a significant performance boost for sequential data base search procedures when accessing data segments including fixed length records. For example, the value loaded in the stride field can indicate the total number of cache lines in each record, and increment the requested address by a corresponding amount in order for each prefetch request to target the same offset in the next sequential record. This can be especially useful when a long or non-standard stride length is being used; the user can simply designate the stride length in the page table entry attribute.

In other embodiments, other attributes can be included in additional fields that can assist in prefetching operations.

Figure 3:
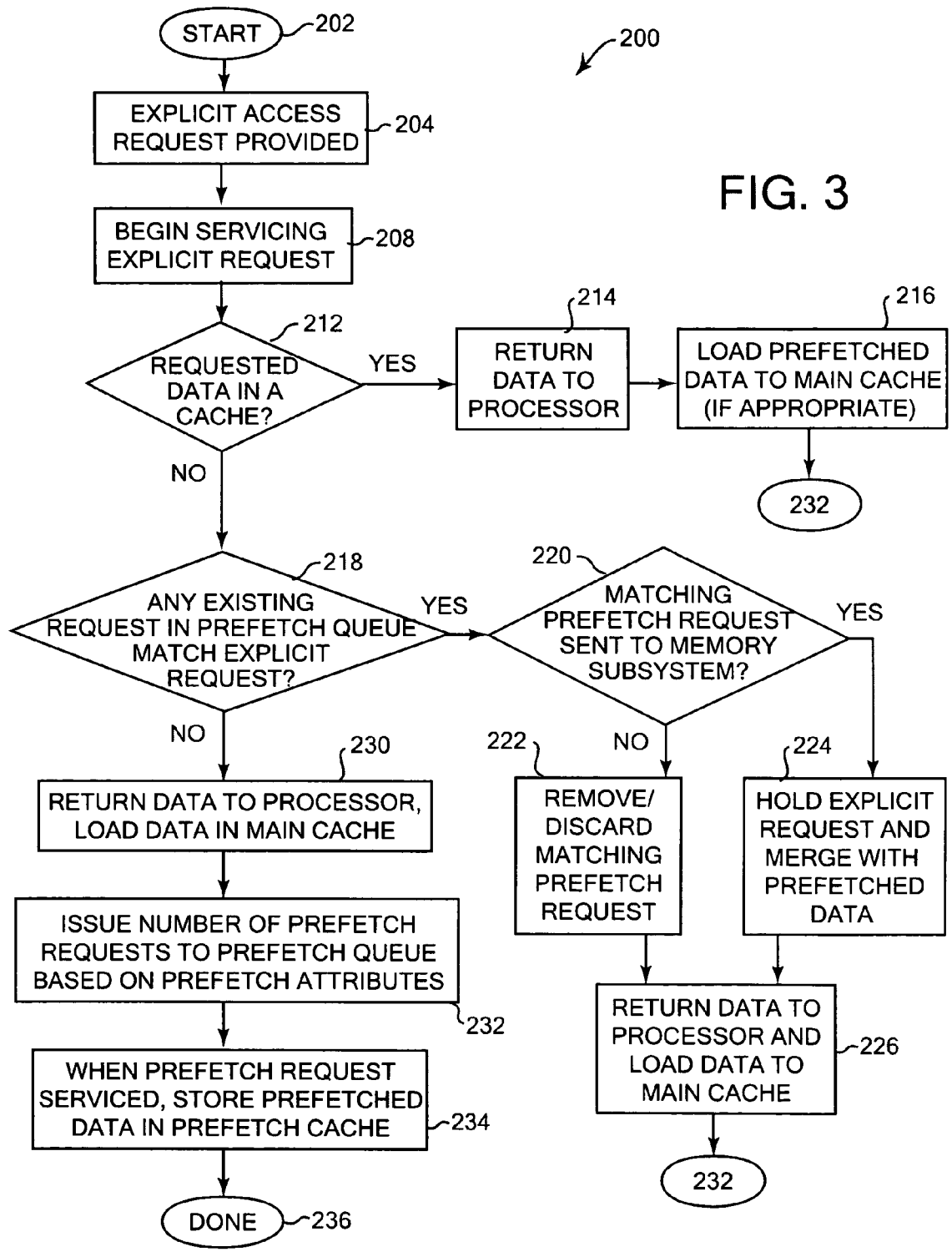
FIG. 3 is a flow diagram illustrating the operation of a basic embodiment of a prefetching mechanism of the present invention.

FIG. 3 is a flow diagram illustrating the operation of a basic embodiment 200 of a prefetching mechanism of the present invention. This process can be implemented by appropriate components of the processor unit 12, memory flow controller 14, and/or other components, as appropriate.

The process begins at 202, and in step 204, an access request from the processor unit 12 (or a component within the processor unit 12) is provided to the memory flow controller 14. For example, the processor may issue an explicit request to retrieve data from the memory subsystem according to an executed instruction.

The processor unit 12 can also issue prefetch requests to prefetch data for anticipated later use (from the prefetch components in the processor unit). This is done according to the present invention in step 232, as described below. To allow the memory subsystem controller to distinguish between explicit requests and prefetch requests, all requests to the memory subsystem in the described embodiment include a mechanism to indicate whether each request is an explicit request or a prefetch request. For example, a 1-bit field can be provided in the request message to indicate the type of request. The memory subsystem controller (not shown), which is located in main memory subsystem 34, can use this indication to place a request in a explicit request queue (if appropriate) if it is an explicit request, or in a prefetch request queue if it is a prefetch request. Explicit request queues and prefetch request queues would typically be located within the memory subsystem controller.

In the described embodiment, the prefetch request queue is a separate queue, in addition to the explicit request queue, that is used to store prefetch requests. This additional request queue acts to separate prefetch requests from explicit requests. This allows subsequent explicit requests that are holding up processor instruction execution to be sent ahead of pending prefetch requests. Thus, priorities of requests from multiple sources can be managed, thereby insuring that prefetch requests do not adversely affect memory access latency for urgent requests.

Processor unit 12 can also provide prefetching based on cache touch instructions, and this form of prefetch does not require the prefetch attributes, although this prefetching would still require other page attributes for access control. A cache touch instruction would typically be used for data that has irregular access patterns that cannot be handled well by sequential prefetch. If a cache touch hit in a page declared for prefetching, the touch instruction can be treated as if it were a demand fetch (i.e., the request described previously) with respect to the prefetch engine of the present invention, thus resulting in subsequent cache lines to also be prefetched.

In step 208, the explicit request of step 204 is begun to be serviced. In step 212, the process checks whether the requested data is in a cache. There are two cache types pertinent to the described embodiment: a main cache and a prefetch cache. A "main cache" herein refers to any of the standard caches used by the system, as appropriate to the particular architecture, such as the L1 cache 13, the L2 cache 24, and any other caches between the processor and main memory 34. The "prefetch cache" is a small cache, located in any convenient location in the processor architecture, that holds prefetched data, i.e., data that has resulted from processing a previous prefetch request from the prefetch request queue. Multiple prefetch caches can be used in some embodiments, e.g., one for each level of main cache. The prefetched data is held in the prefetch cache until that data is explicitly requested by an explicit request that accesses a main cache. Preferably, prefetched data remains in the prefetch cache until actually requested by the processor, thus avoiding potentially unnecessary cast out of data from the main cache to make room for prefetch data that never gets used. This also facilitates continued prefetching of data as the contents of these cache lines are consumed by the processor. In other embodiments, no prefetch caches are used, and all the prefetched data is stored in a main cache.

A typical procedure in servicing an explicit request is to first check if the requested data has been stored in the L1 cache local to the processor unit 12. This data may have been stored in the L1 cache when, for example, a previous explicit request to memory was previously serviced, or during some other operation. If the requested data is not located in the L1 cache, then the requested data is checked for in the L2 cache 24, which might similarly store the requested data after a previous explicit request. If the requested data is not in the L2 cache, then additional memory subsystem cache areas are checked, such as other caches, if present (L3 cache, etc.). If a prefetch cache is being used, then the prefetch cache is checked for the requested data in parallel with checking the associated main cache. In some embodiments, if the explicit request cannot be satisfied from the L1 cache or the equivalent level prefetch cache, then the explicit request is stored in an explicit request queue for the next level of the cache hierarchy. Servicing a request from this request queue may result in a miss in the next level of cache, with some requests eventually propagating up to the explicit request queue within the main memory 34.

At some appropriate point, the explicit request is serviced and is removed from the head of the explicit request queue.

Thus, in the check of step 212, if the requested data is found in a main cache or prefetch cache, then the process continues to step 214, where the requested data is retrieved from the cache and returned for processing at the processor unit 12. When a data block is loaded from a higher level of cache (e.g. L2 or L3) it may be loaded in to lower levels of cache (e.g. L1) as the data block is transferred to the processor. In step 216, if the requested data was found in a prefetch cache, then that prefetch cache data is loaded into the associated main cache (such as the L2 cache), and the prefetch request entry in the prefetch cache is invalidated or discarded. The process is then continues to step 232, described below.

If in step 212 the requested data is not found in a cache, then the process continues to step 218, where it is checked whether there are any existing prefetch requests in the prefetch request queue which match the current explicit request. Processing of the explicit request thus preferably includes examination of the prefetch queue to determine if the processor is now explicitly requesting a cache line that was previously requested on the prefetch queue. If there is no such match, then the process continues to step 230, described below.

It should be noted that this method assumes that if the explicit request finds the requested data in a cache in step 212, then there will be no pending prefetch requests for that data—such prefetch requests would already have completed, if they ever existed—and so step 218 would not be necessary if data is found in the cache.

If the explicit request matches an existing prefetch request in step 218, then in step 220, the process checks whether the matching prefetch request has already been sent to the memory subsystem to retrieve the data for the prefetch request. If the matching prefetch request has not been sent, i.e., is still in the prefetch request queue, then in step 222, the matching prefetch request is removed from the prefetch queue and discarded (or invalidated), and the explicit request is issued. Since the explicit request can be executed immediately, the matching prefetch request is irrelevant, and is discarded to allow other prefetch requests in the queue to move closer to service. The process then continues to step 226, where the data retrieved by the issued explicit request is returned to the processor unit. Furthermore, the retrieved data may also be loaded to additional levels of cache if conditions so warrant, e.g., if the data was retrieved from main memory, it might be loaded into the L2 cache, if conditions are appropriate, as is well known. The process then may continue to step 232 to issue prefetch requests, as described below.

If at step 220 the matching prefetch request has already been sent to the memory subsystem, that request is likely to return data sooner than the new explicit request could. Thus if that is the case, in step 224, the explicit request is not issued, and is instead held until the prefetched data is returned. When the prefetch data is returned, that data is merged with the held explicit request, and in step 226, the prefetched data is returned to the processor unit via the "reload bus" connecting the L2 cache to the processor core. The reload bus is part of the connection shown in FIG. 1 between the processor unit 12 and the core interface unit 22. Furthermore, the data can be loaded to the appropriate main cache, such as the L2 cache, if appropriate. The process then continues to step 232.

If in step 218 there were found to be no prefetch request matches to the explicit request, then the process continues to step 230, where the explicit request is issued, and the retrieved data is returned to the processor unit (this data will be from main memory, since the caches were not found to hold the requested data in step 212). Furthermore, the retrieved data can be stored in a higher level cache, if appropriate. Thus, data retrieved from main memory may also be stored in a higher level cache like the L1 or L2 cache as appropriate to the cache procedures of the system, so that if the processor unit 12 requests the same data, it can be retrieved more quickly from a higher-level cache.

In next step 232, according to the present invention, a number of prefetch requests are sent to the prefetch request queue, where that number is based on the prefetch attributes stored in the page table entry associated with the just-issued explicit request along with the number of prefetch requests already pending for this prefetch stream. This number from the page table entry is thus the number of cache lines of data that are to be prefetched. The number of new prefetch requests issued is reduced by the number of prefetch requests already pending for this prefetch stream. The prefetch requests collectively prefetch a number of sequential cache lines that follow the data retrieved for the explicit request. If the prefetch attributes indicate that zero prefetch requests are to be sent, then no such requests are sent in this step; this indicates that prefetching is not suitable for the current memory page.

For example, as described above, the page table entry for the request can list several memory attributes, including user-defined attributes that hold the number indicating the number of prefetch requests that should be sent for the current or memory page to achieve more efficiency in running the current code. Prefetch attributes are typically applied to pages containing data, where there is knowledge that the program or programs that use this data will typically process the data in a known regular sequence. Thus prefetching this data into the cache ahead of explicit request for the data by the executing program allows the explicit requests to be serviced much more quickly, since access to data in cache is much faster than access to data in main memory. The specified number of prefetch requests can be zero (in which case no prefetch requests are sent), or one or more, and in one embodiment can be determined using profiling techniques as described above with reference to FIG. 2. Other embodiments may use different variations and/or determination of the prefetch attributes, as described below with reference to FIGS. 4 and 5.

The prefetch requests can be sent, for example, after the reading of the prefetch attributes during address translation when processing the explicit request. The processor unit 12 is able to read the attributes from the TLB and then issue the prefetch requests. The memory subsystem controller can distinguish the prefetch requests from explicit requests as described above with respect to step 204.

In an alternate embodiment, as described above with reference to FIG. 2, an additional field in the TLB entry can control the stride for the prefetch requests. The value in the stride field allows the requested address of the prefetch request to be incremented by a particular amount to allow each prefetch request to target the same offset in sequential records, for example.

Prefetch requests sit in the prefetch request queue until a time when it is appropriate to issue the prefetch request, e.g., when there are no urgent explicit requests requiring attention, etc. As one prefetch request gets to the head of the queue and is issued, that request is removed and the other prefetch requests in the queue move up toward the head. In step 234, it is assumed that an appropriate time has arrived for the prefetch requests to be serviced, and the data is retrieved from main memory 34 for each prefetch request. The prefetched data resulting from each prefetch request is stored in the prefetch cache (or in a main cache, if no prefetch cache is being used). Later, during another explicit request, the data in the prefetch cache may be retrieved as well as being loaded into a main cache, as described above with reference to steps 212-216. The process is then complete at 236.

The net result of using the prefetching techniques of the present invention is that most data and instructions are loaded into a cache prior to the point where they are required by the processor, resulting in a significant improvement in cache effectiveness and overall processor performance. Furthermore, no time-consuming analysis of access patterns need be performed to determine whether prefetching is desirable, to what degree, and the appropriate stride; rather, the processor need only look at the prefetch attributes and issue an appropriate number of prefetch requests based on those attributes.

Figure 4:
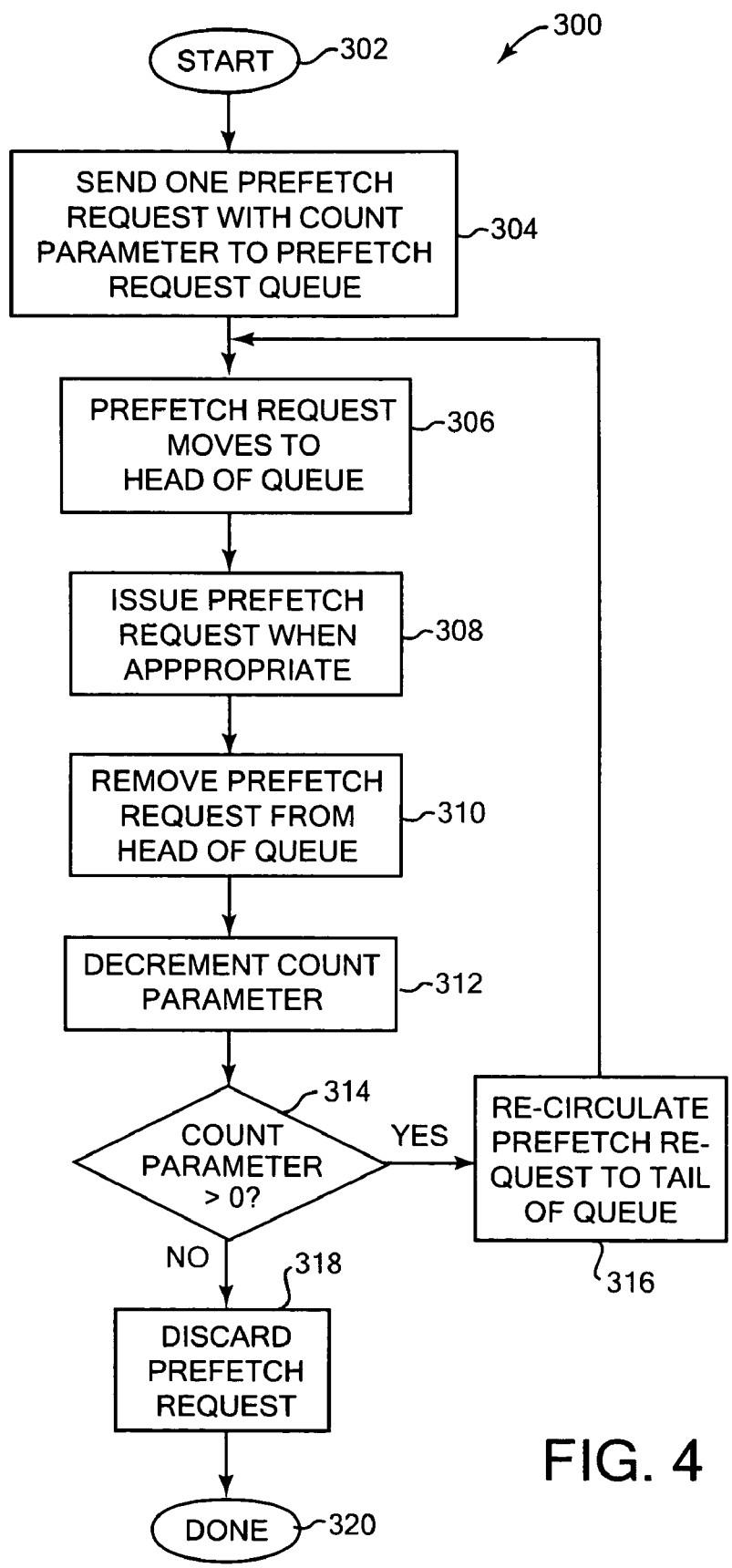
FIG. 4 is a flow diagram illustrating an alternate embodiment of the present invention for providing prefetch requests.

FIG. 4 is a flow diagram illustrating an alternate embodiment 300 of the present invention for providing prefetch requests. Method 300 includes steps that replace steps 232 and 234 of FIG. 3, in which prefetch requests are sent to the prefetch queue based on prefetch attributes in a page table.

The method begins at 302, and in step 304, one prefetch request entry with a count parameter is sent to the prefetch request queue. Step 304 is performed in place of step 232 of FIG. 3. The count parameter is a value that is used to indicate the number of cache lines for prefetch, rather than using multiple prefetch requests as in step 232 of FIG. 3. The count parameter is set equal to the prefetch attribute in the associated page table entry. Thus, if the prefetch attribute were 3, then the count parameter would be set to 3.

In step 306, the prefetch request moves to the head of the prefetch request queue as earlier prefetch requests in the queue are issued as described with respect to FIG. 3. In step 308, the prefetch request is issued when appropriate, e.g., when there is an available slot that is not required for explicit requests. This causes the prefetched data to be stored in a prefetch cache (or other cache), similar to step 234 of FIG. 3. In step 310, the prefetch request entry is removed from the head of the queue.

In step 312, the count parameter in the prefetch request entry is decremented by one. In step 314, it is checked whether the count parameter is greater than zero. If so, then there are additional prefetches that need to be performed, and the process continues to step 316, where the prefetch request is re-circulated to the tail of the queue. Thus the process continues by repeating steps 306 through 316 until the count parameter is found to be zero. The prefetch request will thus be moved up the queue and eventually issued again, as if another prefetch request had been placed in the queue. The address of the re-circulated prefetch request is incremented/changed to the next sequential block address the next time that request is issued.

If the count parameter is not greater than zero, then all of the desired prefetch requests have been performed, and the prefetch request entry is discarded in step 318. The process is then complete at 320.

In addition, in this count parameter embodiment of FIG. 4, step 222 of FIG. 3 can be changed. In step 222, when the matching prefetch request is removed and discarded, instead of discarding the prefetch request, the count parameter is decremented, and if the count is still non-zero, the prefetch request can be reloaded to the tail of the queue, similarly to steps 312, 314, and 316 described above.

The count parameter embodiment has some advantages over the embodiment of FIG. 3. One advantage is that multiple prefetch requests can be held in a single entry, potentially enabling a smaller physical prefetch request queue. In addition, the prefetch request queue results in a distribution of memory bandwidth among prefetch requests for several different memory segments. For example, both code and data (having different pages, and thus different requests for prefetching some number of lines) might be able to step through prefetch actions in parallel instead of getting ahead on one while the processor ends up waiting on the other. This parallel action is allowed because the prefetch requests from the two requesters are interleaved—e.g. when one requester recirculates to the top of the queue, it allows the next one to be acted upon.

Figure 5:
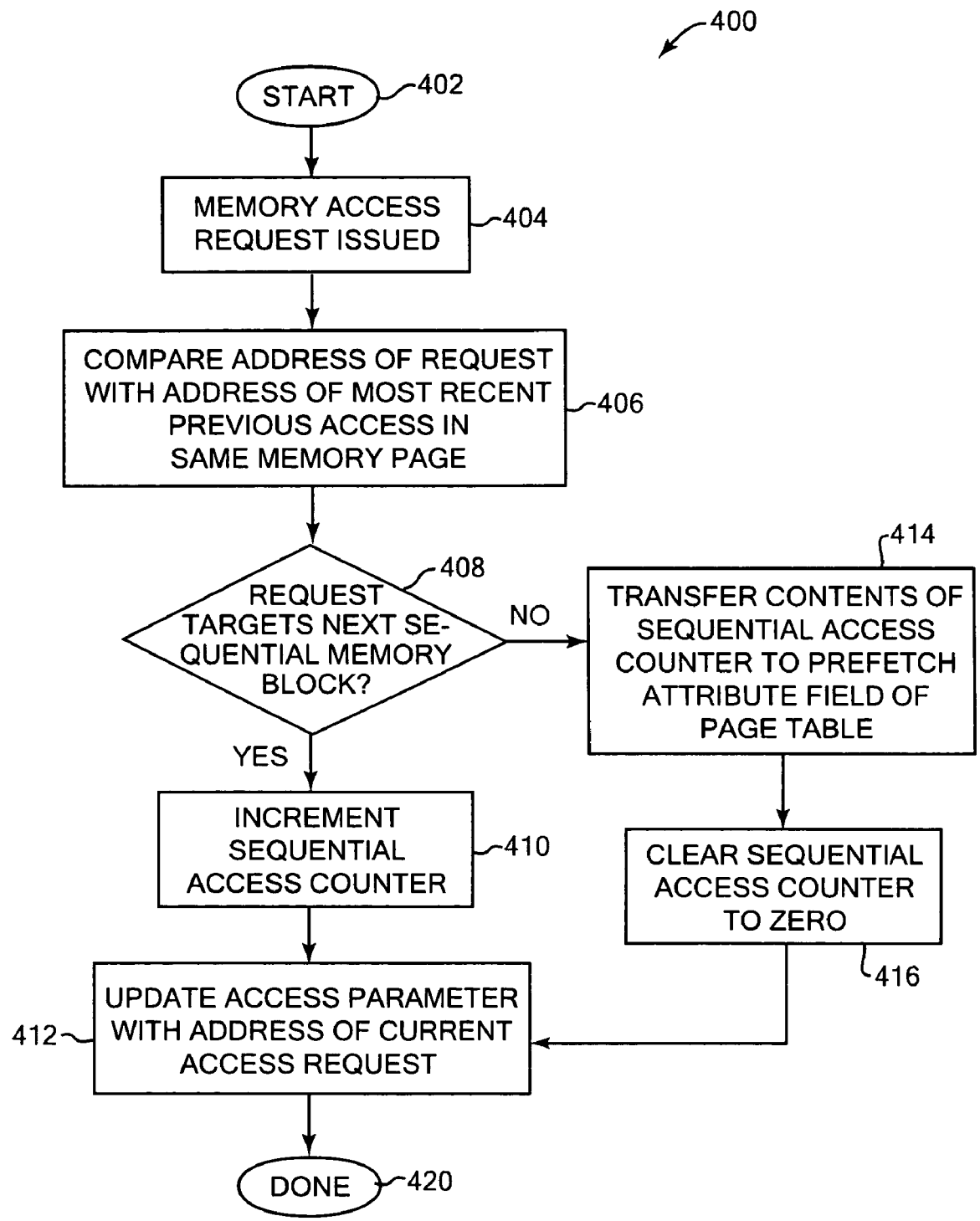
FIG. 5 is a flow diagram illustrating a method of the present invention for providing dynamic prefetch attributes.

FIG. 5 is a flow diagram illustrating an embodiment 400 of the present invention which provides dynamic prefetch attributes. The method 400 can be performed substantially in conjunction with the method 200 of FIG. 3, where the method of FIG. 3 may be used to establish initial values for prefetch parameters, and the method of FIG. 5 may be used to determine and adjust the prefetch attributes in the page table entries to desired levels based on ongoing accesses of the processor and current program execution patterns. In the described embodiment, this method is implemented within the processor unit 12, and assumes the addition of more parameters to each TLB entry in the ERAT cache of the processor core of unit 12. Since the learning of prefetch attributes is applied only to active pages of the page table, these additional parameters do not have to be saved in the larger global TLB table in the TLB cache 20, and in the page table 36 of main memory 34, until they are transferred as prefetch attributes (described below).

The method begins at 402, and in step 404, a memory access request is issued from the processor unit 12. The memory access request can be an explicit request or a prefetch request. In step 406, the process compares the address of the request with the address of the most recent previous access within the same memory page. This comparison can be made by adding an additional access parameter to each TLB entry in the ERAT cache. Each access parameter tracks the most recent address accessed for its associated TLB entry (see step 412). For example, the most recent address can be the address bits required to identify a specific cache-line-sized block within the memory page.

In step 408, the process checks whether the current access request targets the next sequential memory block (cache line sized) from the last, more recent access request, based on the comparison of step 406. If the request targets the next sequential block, then in step 410, a sequential access counter for the associated TLB entry is incremented. A sequential access counter can added to each TLB entry in the ERAT cache as a parameter, similar to the access parameter described above. In one embodiment, the sequential access counter can be a 2-bit counter, with a saturation (maximum) value of 3. After the sequential access counter for the associated TLB entry is incremented, in step 412 the access parameter for the TLB entry is updated with the address of the current access request. The process is then complete at 420.

If the request targets a non-sequential memory block from the most recent access in step 408, then in step 414, the contents of the sequential access counter are transferred to the prefetch attribute field of the associated TLB entry in the TLB cache 20, and to the associated page table entry in the global page table 36 in main memory 34, so that the learned prefetch attributes will be available the next time the same TLB entry is referenced. The non-sequential memory access indicates that another prefetch would not be useful, so the sequential access counter need no longer be incremented, and the number of sequential accesses are used as the prefetch attribute for this page of memory. In next step 416, the sequential access counter for this TLB entry is cleared to zero. In next step 412, the access parameter for the TLB entry is updated with the address of the current access request, and the method is complete at 420.

In the described embodiment, the TLB entries in the ERAT function of the processor unit 12 are subject to the dynamic prefetch learning as described above. When a TLB entry is displaced in the ERAT due to processor access of another page requiring a new entry in the ERAT, the learned prefetch attributes are stored in higher levels of the TLB hierarchy, e.g., in the TLB 20 of MMU 16 and the page table 36 in main memory 34. However, various working variables associated with the ERAT entry can be discarded since they are primarily associated with a specific section of code or data.

In an alternate dynamic attributes embodiment, additional steps can be performed in method 400. For example, the transfer of the sequential access counter contents to the prefetch attribute field in step 414 can be made conditional on that counter value being greater than the current value of the prefetch attribute stored in the TLB entry. Thus, the process would check if the sequential access counter value is greater than the prefetch attribute value for this entry, and if so, perform step 414.

Since this alternate dynamic attributes embodiment can only increase the prefetch attribute value, a second mechanism is used to reduce the prefetch attribute value if prefetching ceases to increase efficiency of the processor operations or otherwise ceases to be of value. This second mechanism checks whether any cache line is cast out of the prefetch cache, that cache line including prefetched data that was never used. If such a cache line was cast out, then the prefetch attribute for the TLB entry associated with the cast out prefetched data is decremented by one, with a lower limit of zero. This indicates that prefetching was not useful to the processor for that memory page, since the prefetched data was not used. As described above for FIG. 3, once the processor accesses prefetched data, the prefetched data is moved to the main cache (if not already present there), and the prefetched data in the prefetch cache is invalidated. Later prefetched data is placed in previously invalidated entries, if possible, and if not, are placed in entries where the data previously stored there is cast out according to a standard Least Recently Used (LRU) algorithm or other method. The LRU algorithm can determine which prefetched data was never used, and indicates for which TLB entry to decrement the prefetch attribute. The cast out prefetched data in the prefetch cache is associated with the appropriate TLB entry via the tag for that cache line. This association is needed in order to determine which TLB entry to update the prefetch attribute.

In a variation of the above-described alternate dynamic attribute embodiment, the contents of the sequential access counter are transferred to the prefetch attribute only when the counter is greater than the current value of the prefetch attribute as described above, and in addition, the prefetch attribute is incremented only by one for each such transfer. This can prevent increasing the prefetch attribute too much too quickly, i.e., prevent an overreaction to an isolated sequence of memory addresses.

Furthermore, as a variation to the decrement of the prefetch attribute as described in the alternate embodiment, the prefetch attribute can be allowed to go to a value below zero. For example, the value can saturate at a lower limit of −1. When examining the prefetch attribute for issuing prefetch requests (as in step 232 of FIG. 3), a negative attribute can be interpreted the same as a zero (i.e., no prefetching performed). However, the negative number allows a form of hysteresis to be used, to help prevent useless prefetch actions due to isolated sequences of sequential accesses. This is because two occurrences of sequential access would have to be detected, thus incrementing the prefetch attribute twice from a value of −1 to a value of 1, to cause a single prefetch request to be sent.

The dynamic prefetch attribute embodiments have advantages over the static attribute embodiments. The dynamic embodiments have the capability to "learn" the optimal level of prefetching for particular source code for each memory page, based on previous accesses to the same region of memory (as defined by a TLB entry), allowing more optimal performance.

A pseudocode description of the alternate dynamic prefetch attribute embodiment is listed below.

```
/* For each access request by the processor to the L2 cache, the following actions are required:
/* First see if the requested data is in prefetch cache. T is index into ERAT cache */
InPrefetchCache = False;
For (i=0; i=N; i++) {    /* look for it in prefetch cache (N = # of cache ways, level of associativity)
    If (PrefetchCacheTag.Addr[i] == L2accessAddr) {
        Buffer2L2 = PrefetchCache[i];           /* Will throw away if also in L2 */
        PrefetchCacheTag.state[i] = Invalid;    /*If there, give to L2 & make room*/
        If (0 < (L2accessAddr − TLB[T].LastAddr)<=(TLB[T].Stride * TLB[T].Prefetch)) {
            TLB[T].PrefetchCnt = (TLB[T].PrefetchAddr − L2accessAddr) / TLB[T].stride;
/* if at last address of page, stop */
        }
        InPrefetchCache = True;
    }
}
/*Next track requests to L2 to alter desirable level of prefetch*/
If (L2accessAddr == (TLB[T].LastAddr + TLB[T].Stride) {
    TLB[T].LastAddr = L2accessAddr;             /*Learning Address*/
    TLB[T].CurrentCnt++;                        /*Learning Count*/
    If ((TLB[T].CurrentCnt % 4) == 0) TLB[T].Prefetch ++;/*saturation 3*/
}
Else {
    If (L2miss) {
    L2missAddr = L2accessAddr;
    If (L2missAddr != (TLB[T].LastAddr + TLB[T].Stride)) {
        If (TLB[T].CurrentCnt > TLB[T].Prefetch) TLB[T].Prefetch ++;/*saturation at 3*/
            TLB[T].CurrentCnt = 0;
            TLB[T].LastAddr = L2missAddr;
            TLB[T].PrefetchCnt = 0; /*Sequ. Prefetches available*/
            TLB[T].PrefetchAddr = L2missAddr + TLB[T].Stride;
        }
        If (InPrefetchCache) Data2L2 = Buffer2L2;
        If (!InPrefetchCache) Data2L2 = FetchAction(L2missAddr);
```

-continued

```
    }
}
/*Next, see if a new prefetch is required */
While (TLB[T].Prefetch > TLB[T].PrefetchCnt) {
    K = -1;
    For (i=0; i=N; i++) { /*look for unused line*/
        If (PrefetchCacheTag.state[i] == Invalid) K=i;
    }
    If (K == -1) {
        For (i=0; i=N; i++) {       /*look for LRU*/
            If (PrefetchCacheTag.state[i] == LRU) K=i;
        }
    }
    For (k=0; k=M; k++) { /*Search ERAT cache for TLB matching cache line to be cast out*/
        If (PrefetchCacheTag.TLB[K]==TLB[k].TLB) TLB[T].Prefetch --; /*saturation at -1
    }
    PrefetchCache[K] = PrefetchAction(TLB[T].PrefetchAddr); /* wait here for memory*/
    TLB[T].PrefetchAddr += TLB[T].Stride;
    TLB[T].PrefetchCnt ++;   /*Count of prefetches relative to last address */
}
```

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for prefetching data for use by a processor, the method comprising:

providing an explicit request for data stored in a page of a memory;

checking whether the explicit request matches any previously-provided prefetch request, wherein if the explicit request matches a previously-provided prefetch request, removing the previously-provided prefetch request from a prefetch request queue if it has not yet been issued to the memory;

examining a prefetch attribute stored in a page table entry associated with the page of memory for the explicit request, the page table entry used for translating an address used by the explicit request to a physical address of the page of the memory, wherein the prefetch attribute indicates the suitability of prefetching additional data in the page of the memory associated with the page table entry; and determining whether to provide one or more prefetch requests based on the prefetch attribute, the prefetch requests operative to retrieve and store the additional data from the memory that potentially will be requested by the processor.

2. A method for determining a dynamic prefetch attribute for use in prefetching data for a processor, the method comprising:

incrementing a counter value if a memory access request to a page of memory targets a next sequential block of memory relative to the most recent previous access in the page of memory; and transferring the counter value to a prefetch attribute for the page of memory when a memory access does not target the next sequential block of memory and when the counter value is greater than a current value of the prefetch attribute, the prefetch attribute being stored in a page table entry associated with the page of memory, wherein the prefetch attribute indicates the suitability of prefetching additional data in the page of the memory associated with the page table entry and is examined during explicit access requests to the memory to determine the number of prefetch requests to provide.

* * * * *